United States Patent [19]

Lynch et al.

[11] Patent Number: 5,114,485

[45] Date of Patent: May 19, 1992

[54] WATER-IN-WATER MULTICOLOR PAINT AND METHOD

[75] Inventors: James F. Lynch, Schaumburg; John Predkelis, Glen-Ellyn, both of Ill.

[73] Assignee: Multicolor Specialties, Inc., Cicero, Ill.

[21] Appl. No.: 694,311

[22] Filed: May 1, 1991

Related U.S. Application Data

[63] Continuation-in-part of Ser. No. 586,762, Sep. 21, 1990.

[51] Int. Cl.⁵ .............................................. C09D 5/29
[52] U.S. Cl. ................................. 106/311; 106/26; 106/27; 106/28; 106/29; 106/30; 106/32; 106/163.1; 106/203; 106/204; 106/209; 106/401; 106/468; 106/482
[58] Field of Search ................. 106/26, 170, 288, 28, 106/29, 30, 32, 204, 209, 214, 163.1, 203, 311, 401

[56] References Cited

U.S. PATENT DOCUMENTS

| | | | |
|---|---|---|---|
| 3,370,024 | 2/1968 | Grasko et al. | 260/3.5 |
| 3,811,904 | 5/1974 | Zola | 106/288 |
| 3,852,076 | 12/1974 | Grasko | 106/26 |
| 3,950,283 | 4/1976 | Sellars et al. | 106/170 |
| 4,376,654 | 3/1983 | Zola | 106/170 |

FOREIGN PATENT DOCUMENTS

1298201 11/1972 United Kingdom .

*Primary Examiner*—Mark L. Bell
*Assistant Examiner*—S. Hertzog
*Attorney, Agent, or Firm*—Olson & Hierl

[57] ABSTRACT

A water-in-water multicolored paint composition is provided having a disperse phase and a continuous phase. The disperse phase preferably is comprised of water dispersable, film-forming, crosslinkable, carboxylated polymer; crosslinking agent; hydroxy (lower alkyl) cellulose; quaternized water soluble cellulose ether; peptized clay; and water. The continuous phase preferably is comprised of a water dispersable, crosslinkable, carboxylated polymer or copolymer, a peptized clay and water. Methods for preparing the paint are also provided.

19 Claims, 1 Drawing Sheet

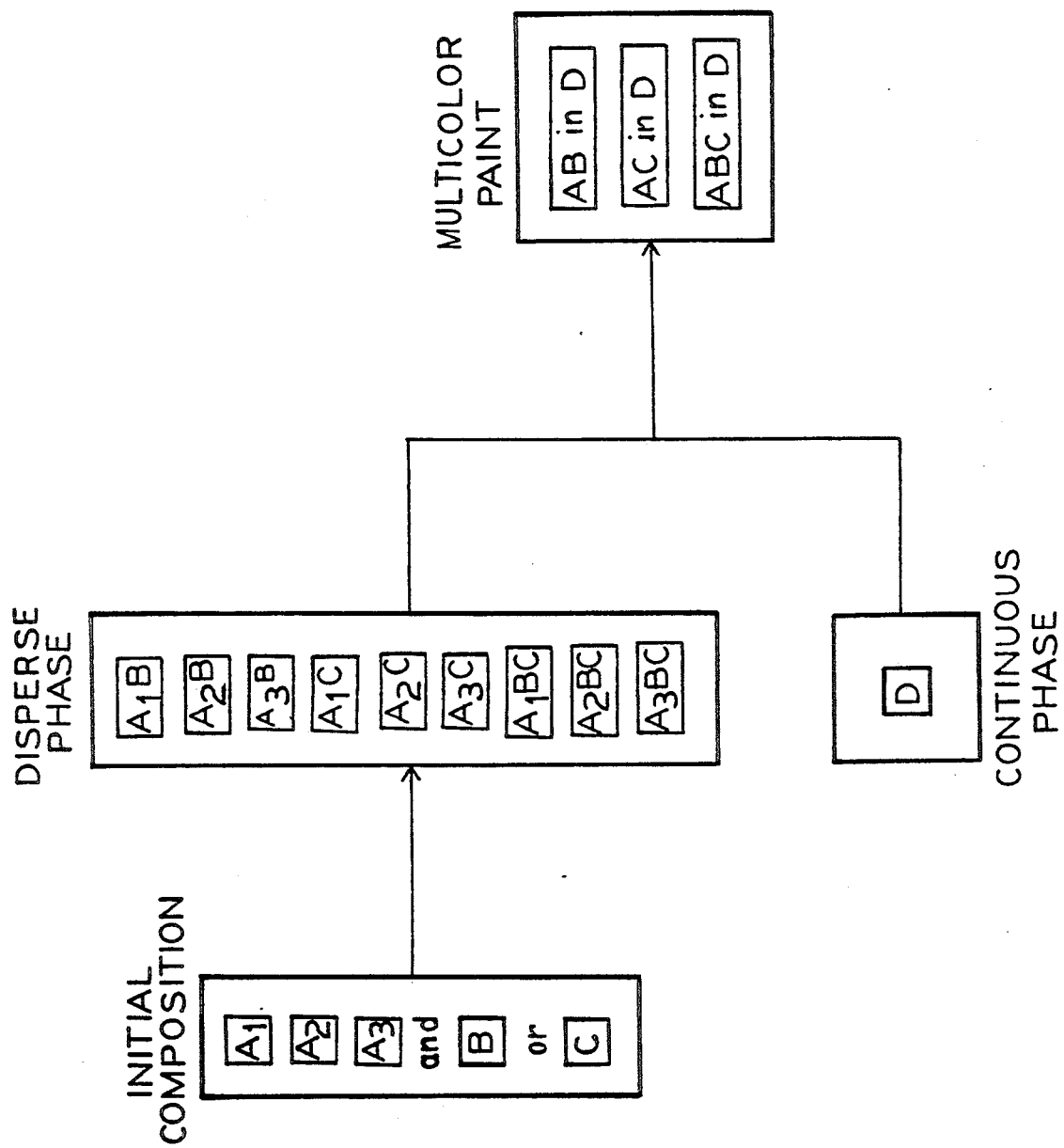

WATER-IN-WATER MULTICOLOR PAINT AND METHOD

CROSS-REFERENCE TO RELATED APPLICATION

This application is a continuation-in-part of pending application Ser. No. 586,762, filed Sep. 21, 1990.

FIELD OF THE INVENTION

The present invention is directed to a water-in-water multicolor paint emulsion which can be applied as a surface coating with a paint roller or brush and can be sprayed with spray equipment.

BACKGROUND OF THE INVENTION

A multicolor paint is a composition which, when coated on a surface and dried, results in a coating that is characterized by dispersed discrete spots (or dots). Water-in-water multicolor paints have been proposed (see, for example, Sellars et al. U.S. Pat. No. 3,950,283, Grasko U.S. Pat. No. 3,852,076 and Zola U.S. Pat. No. 4,376,654) and are of commercial interest particularly in view of the developing governmental interest in establishing regulations limiting the quantity of organic volatiles emitted into the environment by a paint during application and subsequent air drying. The states of California, New Jersey and New York, for example, have adopted regulations limiting paint emissions and many other states reportedly will be adopting similar regulations.

It is difficult to prepare a commercially acceptable water-in-water multicolor paint because of various problems. One problem is the fact that the discrete color bodies comprising the disperse phase in such a paint need to contain a relatively high concentration of a water soluble, film-forming polymer in order to achieve commercially acceptable characteristics in the resulting coating. Another problem is that such polymers should be in a highly water insoluble state after the paint has been coated and dried; otherwise, the coated and dried paint provides little or no water resistance. Another problem is to prepare and utilize a disperse phase composition which can be formed into discrete color bodies that have sufficient structural integrity in the continuous phase of the paint for practical commercial purposes. Structurally weak discrete color bodies would break up easily and become part of this continuous phase.

Prior art multicolor paints commonly contain a solution or dispersion of a film-forming polymer in an organic liquid carrier with the polymer being, for example, nitrocellulose or styrene butadiene, and the carrier liquid being mineral spirits or the like. However, the solubility and dispersability of the polymers in water is so limited as to make it impossible to use the polymers in making a water-based paint of commercially acceptable quality. It is also not practical to "fortify" the water with a water-miscible organic co-solvent to enhance polymer solubility or dispersability because the maximum amount of the organic co-solvent which can be present should be kept below about 7-8 weight percent on a total product paint composition basis in order to comply with the foregoing proposed regulatory standards.

So far as now known, no one has previously succeeded in preparing a water-in-water multicolor paint wherein the aqueous disperse phase color bodies are characterized by having:

(a) a relatively high content of water dispersable, film-forming, crosslinkable polymer in association with a crosslinking agent,
(b) a relatively high structural integrity, and
(c) a capacity to form highly crosslinked water insoluble, chemical resistant, mar resistant and thermally stable coatings with a high degree of hardness after paint application and drying.

SUMMARY OF THE INVENTION

The present invention provides an improved water-in-water multicolor paint having a continuous phase and a disperse phase, and wherein disperse phase bodies provide the foregoing combination of characteristics. The invention further provides improved multicolored surface coatings produced from the application and drying of the multicolor paint.

In the disperse phase bodies thereof, there is incorporated a mixture of dissolved polymeric materials comprised of:

(a) water dispersable, film-forming, crosslinkable, carboxylated polymer, and
(b) hydroxy (lower alkyl) cellulose and/or alkali metal carboxyl (lower alkyl) cellulose.

Additionally present in the discontinuous phase bodies is a crosslinking agent for the crosslinkable polymer which agent is selected from the class consisting of water dispersable multifunctional carbodiimides and water dispersable polyfunctional aziridines. Also, a pigment is optionally but preferably present in the disperse phase bodies.

Also present in the discontinuous phase bodies is at least one of either a quaternized cellulose ether, or an aqueous gel that is comprised of a water swellable clay, a peptizing agent and water. Preferably both such materials are present. When an aqueous gel is present, the water swellable clay is preferably a synthetic hectorite clay and the peptizing agent is preferably tetrasodium pyrophosphate. These agents not only thicken, but also improve the structural integrity of the disperse phase bodies.

Optionally, but preferably, also present in the discontinuous phase bodies are conventional paint additives including plasticizers, silicone bonding agents, antifoaming agents, wetting agents, and/or the like.

The disperse phase bodies are dispersed in a continuous phase that comprises an aqueous gel which is likewise comprised of a clear or pigmented vehicle including a water dispersable, crosslinkable carboxylated polymer or copolymer, a peptized clay and optionally a pigment. The clay is preferably a synthetic hectorite clay, and the peptizing agent is preferably tetrasodium pyrophosphate.

The addition of such a polymer or copolymer in the foregoing continuous phase (and in the discontinuous phase as indicated) produces a more impregnable film with a higher solids content and better hiding properties relative to a paint which includes a continuous phase formed with a similar, but non-carboxylated, polymer. When the foregoing polymer is crosslinked, a high degree of hardness, mar resistance, chemical resistance and thermal stability is provided.

The presently most preferred carboxylated polymer is a carboxylated styrene acrylate copolymer, and the presently most preferred crosslinking agent is a multifunctional carbodiimide. Such a combination displays excellent high mutual water dispersability, film-forming capacity, and dried film water resistance.

The inventive multicolor paints characteristically display excellent shelf life stability and the capacity to form water resistant coatings when the paint is applied and dried as a surface layer.

Also, the inventive multicolor paints are characterized by a sufficiently low content of volatile organic components to be acceptable under certain proposed and recently adopted governmental regulations concerning paints and coatings.

So far as now known, neither water-in-water multicolor paints, nor the dried coatings produced therefrom, have previously been developed with such characteristics.

Other and further objects, aims, purposes, features, advantages, embodiments, and the like will be apparent to those skilled in the art from the present specification taken with the appended claims.

BRIEF DESCRIPTION OF THE DRAWINGS

In the drawing, a flow sheet is shown illustrating blending sequences suitable for use in practicing the present invention.

DETAILED DESCRIPTION

(a) Definitions

The term "water dispersable" as used herein with reference, for example, to a carboxylated polymer or crosslinking agent or like material, means that the material can form a water solution or a colloidal suspension in water. However, to enhance the water dispersability of such a material, and to increase the amount of the material which is present in a water dispersed form in the disperse phase of a multicolor paint of this invention, the water is preferably admixed with a water miscible organic liquid, such as hereinafter characterized and illustrated, wherein, for example, the polymer or other material, is at least as dispersable as in water. Preferably, such a polymer or other material is characterized by a capacity to disperse in water-miscible organic solvents to an extent similar to that of the material dispersability in water alone.

The term "crosslinkable" as used herein with reference to a water dispersable carboxylated polymer means that the polymer, after being applied to a surface from an aqueous coating composition and allowed to form a film or coating, crosslinks and becomes water insoluble through reaction with a water dispersable crosslinking agent which is also present in the aqueous coating composition. The crosslinking occurs preferably during the drying which takes place after the aqueous coating composition of the polymer and the crosslinking agent are applied as a coating to the surface and the aqueous carrier of the coating composition is evaporated. Also, the crosslinking preferably occurs at ambient temperatures and pressures, although heat may be used to accelerate the drying and crosslinking reaction.

The term "storage stability" as used herein with reference to a multicolor paint of this invention means that the paint passes the test procedure of ASTM D-1849-80 which test relates to package stability of paint stored in a 1 quart or 1 liter container at $125°\pm2°$ F. ($52°\pm1°$ C.) for 1 month or 2 months, respectively, as regards consistency and settling.

The term "structural integrity" as used herein in relation to a multicolor paint and the disperse phase bodies therein refers to the ability of the disperse phase bodies therein to remain stable and substantially unchanged when subjected at ambient temperature and pressure to a shear mixing force exerted by a Cowles mixing blade operating at about 450 to about 500 rpm.

As used herein, the term "water resistance" as used herein with reference to a coated and dried film or coating produced from a multicolor paint of this invention refers to the test procedure of ASTM D-1308-79 with regard to both covered and open spot tests.

The term "paint" is used herein in the broad sense of a coloring and coatable substance for spreading as a coating on a surface.

(b) Starting Materials

The water dispersable, film-forming, crosslinkable, carboxylated polymers which are employed as starting materials in the practice of this invention are generally known in the prior art and do not as such constitute part of the present invention. Some examples of such polymers are shown in Table I below. Typically and preferably, the polymer contains at least about 2 weight percent of carboxyl groups on a 100 weight percent total polymer weight basis, and more preferably at least about 3 weight percent. Preferably, such a polymer does not contain more than about 7 weight percent of carboxyl groups (same basis).

TABLE I

| | CROSSLINKABLE, WATER SOLUBLE, FILM FORMING POLYMERS | | |
|---|---|---|---|
| ID No. | Chemical Name | Trade Name/ Trade Mark | Manufacturer/ Source |
| 1. | Carboxylated Styrene Acrylate Copolymer | "Pliolite" 7103 & 7104 | Goodyear |
| 2. | Carboxy-Modified Acrylic | "Hycar" 26171 | B. F. Goodrich |
| 3. | Carboxy-Modified Acrylic | "Hycar" 26137 | B. F. Goodrich |
| 4. | Carboxy-Modified Acrylic | "Hycar" 26322 | B. F. Goodrich |
| 5. | Carboxy-Modified Acrylic | "Hycar" 26083 | B. F. Goodrich |
| 6. | Carboxy-Modified Acrylic | "Hycar" 26092 | B. F. Goodrich |
| 7. | Carboxy-Modified Acrylic | "Hycar" 2671 | B. F. Goodrich |
| 8. | Carboxy-Modified Acrylic | "Hycar" 26796 | B. F. Goodrich |
| 9. | Carboxy-Modified Acrylic | "Hycar" 26084 | B. F. Goodrich |
| 10. | Carboxy-Modified Acrylic | "Hycar" 26091 | B. F. Goodrich |
| 11. | Carboxy-Modified Acrylic | "Hycar" 26288 | B. F. Goodrich |
| 12. | Carboxy-Modified Acrylic | "Hycar" 26106 | B. F. Goodrich |
| 13. | Carboxy-Modified Acrylic | "Hycar" 26172 | B. F. Goodrich |
| 14. | Carboxy-Modified Vinyl Chloride | "Geon" 460x6 | B. F. Goodrich |
| 15. | Carboxy-Modified Vinyl Chloride | "Geon" 460x45 | B. F. Goodrich |
| 16. | Carboxy-Modified Vinyl Chloride | "Geon" 460x46 | B. F. Goodrich |
| 17. | Carboxy-Modified Vinylidene Copolymer | "Geon" 460x61 | B. F. Goodrich |
| 18. | Carboxy-Modified High Acrylonitrile | "Hycar" 1571 | B. F. Goodrich |
| 19. | Carboxy-Modified Special Acrylonitrile | "Hycar" 1570x55 | B. F. Goodrich |
| 20. | Carboxy-Modified Special Acrylonitrile | "Hycar" 1572 | B. F. Goodrich |
| 21. | Carboxy-Modified Special Acrylonitrile | "Hycar" 1578 | B. F. Goodrich |
| 22. | Carboxy-Modified Styrene Butadiene | "Goodrite" 2570x59 | B. F. Goodrich |

TABLE I-continued
CROSSLINKABLE, WATER SOLUBLE, FILM FORMING POLYMERS

| ID No. | Chemical Name | Trade Name/ Trade Mark | Manufacturer/ Source |
|---|---|---|---|
| 23. | Carboxy-Modified Vinyl Acetate | "Polyco" 2149c | Borden |
| 24. | Carboxy-Modified Vinyl Acetate | "Polyco" 2142 | Borden |
| 25. | Carboxy-Modified Styrene Butadiene | "Darex" 5101 | W. R. Grace |
| 26. | Carboxy-Modified Styrene Butadiene | "Darex" 5261 | W. R. Grace |
| 27. | Waterborne Aliphatic Urethane | "Sancure" 898 | Sanncor Ind. |
| 28. | Waterborne Aliphatic Urethane | "Q-Thane" QW-18 | K. J. Quinn & Co. |

As indicated above, a carboxylated styrene acrylate copolymer is the most preferred carboxylated polymer type for use in the practice of the present invention. For example, this product is available from Goodyear under the trademark "Pliolite" 7103 and 7104, and apparently contains about 65 percent by weight styrene and about 35 percent by weight of butyl acrylate and is carboxylated to an extent sufficient to contain about 3 to 4 weight percent carboxyl groups on a 100 weight percent total polymer weight basis.

Such a polymer, for example, can be comprised of about 50 to about 75 weight percent styrene and correspondingly about 25 to about 50 weight percent of at least one (lower alkyl) acrylate monomer on a total polymer weight basis. The acrylate monomer is preferably n-butyl acrylate. Such a polymer is characterized by the feature that, after its formation, it contains pendant carboxylic functional groups which are reactive with a multifunctional carbodiimide or with a polyfunctional aziridine to produce a crosslinked, water-insoluble product. The molecular weight of the starting polymer is low enough to permit the polymer to be water dispersable.

The hydroxy (lower alkyl) cellulose materials employed in the practice of this invention as starting materials are generally known in the prior art and do not as such constitute a part of the present invention. As used herein, the term "lower alkyl" generally refers to an alkyl moiety containing from (and including) one through four carbon atoms. Presently most preferred as a cellulose type additive material for use in this invention is hydroxyethyl cellulose, which is available commercially under the trademark "Cellosize" from the Union Carbide Chemicals Company. Such a material is a water-soluble cellulose ether which is believed to be interactive with peptized water swellable clays in aqueous gels, thereby aiding in the formation and maintenance of the disperse phase bodies in a multicolor paint composition of this invention. Hydroxypropyl cellulose is also useful, for example.

The alkali metal carboxy (lower alkyl) cellulose materials employed in the practice of this invention as starting materials are generally known to the prior art and do not as such constitute a part of the present invention. Presently a most preferred alkali metal carboxy (lower alkyl) cellulose is sodium carboxy methyl cellulose. One such material is available commercially as "CMC-7-7H3SF" from the Aqualon Company.

The cationic quaternized cellulose materials employed in the practice of this invention as starting materials are also generally known in the prior art. These polymeric materials are available commercially, for example, from Union Carbide Corporation under the trademark "Polymer JR" or "UCARE Polymer" in a variety of viscosity grades. These materials are also known as, and designated by, the CTFA (that is, the Cosmetic, Toiletry and Fragrance Association, Inc.) as "Polyquaternium-10" which is defined as a polymeric quaternary ammonium salt of hydroxyethyl cellulose that has been reacted with a trimethyl ammonium substituted epoxide. Such a water-soluble cellulose ether is theorized to be interactive with at least one other component present in the disperse phase bodies employed in a paint of the present invention; however, the nature of this interreaction is not now known.

The pigment employed in the practice of this invention as a starting material can be selected from among the various pigments known in the prior art. Preferably, the pigment is in the form of dispersable particles having ultimate particle sizes in the submicron range. The pigment should preferably also be substantially insoluble in water or in organic solvents. While a pigment should have a positive colorant value, it can be organic, inorganic, or a mixture of organic and inorganic materials. If desired, as those skilled in the art will appreciate, the pigment can be prepared preliminarily as a slurry, dispersion, or the like in water and/or organic liquid for purposes of simple mechanical blendability Presently preferred pigments include, for example, titanium dioxide; lamp black; carbon black; bone black; phthalocyanine blue; phthalocyanine green; various organic and inorganic yellow pigments, such as, for example, D & C yellows including quinoline yellow, yellow iron oxide, and the like; various organic and inorganic red pigments, such as, for example, D & C reds including quinacridone red and red iron oxide, respectively, and the like; etc.

The dispersable, water swellable clays employed in the practice of this invention can be selected from among the various known such clays, both natural and synthetic. Preferably, the clay selected is a silicate which has an ultimate particle size in the submicron range. Examples of suitable clays include synthetic silicate clays resembling hectorite and/or saponite, montmorillonite, beidellite, nontronite, sauconite, stevensite, smectite and other inorganic minerals which are characterized by a tendency to swell by absorbing water between adjacent crystal layers, and to split into fragments capable of forming colloidal dispersions. A presently most preferred silicate clay is a synthetic sodium magnesium lithium silicate hectorite-type clay. This material is obtainable commercially from Waverly Mineral Products of Balacynwyd, Penna. which is a subsidiary of La Porte Inc. of the United Kingdom under the trademark designation "Laponite" RD or RDS. Other suitable hectorite clays are available commercially from the R. T. Vanderfilt Company under the trademark "Veegum T", or from the Baroid Div., National Lead Company under the trademark "Macaloid".

The above described clays are employed in the practice of this invention in combination with a water soluble peptizing agent. Such an agent induces the clay to form a stable colloidal aqueous dispersion. Use of such an agent is conventional with such clays. Examples of known water soluble peptizing agents include ammonium hydroxide, hydrogen peroxide, sodium carbonate, sodium citrate, sodium hydroxide, sodium oxalate, sodium silicate, sodium tripolyphosphate, sodium hexametaphosphate, tetrasodium pyrophosphate, and the like. The last named peptizing agent is presently preferred for use in the practice for this invention.

The multicolor paint compositions of this invention contain, in the disperse phase and the continuous phase, a crosslinking agent which is effective for crosslinking the carboxylated crosslinkable polymers involved. Suitable water dispersable crosslinking agents for use in this invention which can interreact with such polymers at ambient temperatures and pressures are preferably polyfunctional aziridines and multifunctional carbodiimides (the latter class being presently preferred). Such materials are known in the prior art and are available commercially. These materials as such do not form a part of the present invention.

Carbodiimides (sometimes also called cyanamides) are a well-known class of organic compounds having the general structure:

$$R_1-N=C=N-R_2$$

where $R_1$ and $R_2$ are each an organic moiety. Carbodiimides crosslink with carboxylic acid groups to form N-acyl ureas.

A presently preferred carbodiimide is available commercially from Union Carbide under the trademark "UCARLNK XL-25 SE" which is designated as "multifunctional" and is designed for use as a low-temperature crosslinking agent for polymers such as carboxylated polymers.

Aziridines are organic compounds based on the ring structure:

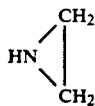

A presently preferred crosslinking polyfunctional aziridine is "ZAMA-7" which is designated "polyfunctional" and is available commercially from Hoechst Celanese and also from Virginia Chemicals. This material also is designed for use as a low-temperature crosslinking agent for polymers such as carboxylated polymers.

The disperse phase bodies and the pigmented, unpigmented or colored continuous phase of this invention preferably incorporate a water-miscible organic liquid as a co-solvent in combination with the water employed therein. Any convenient water miscible organic liquid can be used, but presently preferred such liquids include ester alcohols, such as the material available commercially from Eastman Kodak Company under the trademark "Texanol"; glycol ethers, such as diethylene glycol butyl ether, which is available from Union Carbide Corporation under the trademark "Butyl Carbitol"; and ethylene glycol butyl ether, which is available from Union Carbide Corporation under the trademark "Butyl Cellosolve"; and the like. N-Pyrrolidine which is available from GAF can also be used.

(c) Preparation of Blending Compositions

It is convenient and presently preferred to prepare four compositions initially, which are designated respectively as "Composition A", "Composition B", "Composition C" and "Composition D", each of which is described below.

Composition A

Composition A is conveniently prepared by preliminarily dissolving the water dispersable, film-forming, crosslinkable carboxylated polymer and the hydroxy (lower alkyl) cellulose in a water/co-solvent mixture. Thereafter, the pigment when used is conveniently dispersed in the resulting mixed solution.

Typically, but preferably, Composition A also includes various optional additives of the type conventionally used in paint formulations, such as plasticizers, bonding agents, anti-foaming agents, wetting agents, fungicides, neutralizers and the like. It can be regarded as a feature of the present invention that such additives can be used effectively in a multicolor paint of this invention and can achieve their respective known effects without adversely affecting such desirable paint properties as formulatability, storage stability, applied dried coating water resistance, disperse phase body structural integrity, or the like.

Examples of suitable plasticizers preferably include monomeric plasticizers, such as phthalates like dibutyl phthalate, diisodecyl phthalate, dioctyl phthalate, tricresyl phosphate, butyl benzyl phthalate, and the like. Other suitable monomeric plasticizers can be selected from among the adipates, sebacates, glycolates, castor oils, and the like.

Examples of suitable bonding agents include epoxidized silozanes, such as a glycidyl silane like glycidoxy trimethoxy silane, and the like.

Examples of suitable anti-foaming agents include the material available commercially from Henkel under the trademarks "Foamaster VL", "Dehydran 1293", "Nopco NXZ", and the like.

Examples of suitable wetting agents include polycarboxylic acid salts such as are available from Rohm and Haas under the trademark "Tamol" 165 and also the materials that are available commercially from Rohm and Haas under the trademark "Triton", especially the products CF10 and X100.

The preferred compositional characteristics of a Composition A are shown in Table II below:

TABLE II

| | COMPOSITION A | | |
|---|---|---|---|
| Ident. No. | Component | Weight Percent 100% Basis | |
| | | Broad (about) | Preferred (about) |
| 1 | Carboxylated polymer | 10–40% | 14–16% |
| 2 | Hydroxy (alkyl) cellulose | 0.5–2.0% | 0.75–1.25% |
| 3 | Crosslinking agent | 0.5–10% | 5–6% |
| 4 | Water | 80–20% | 65.0–44.0% |
| 5 | Organic co-solvent | 0–10% | 8–9.9% |
| 6 | Pigment | 0–30% | 5–20% |
| 7 | Monomeric plasticizer | 0–3% | 1–2% |
| 8 | Bonding agent | 0–0.50% | 0.10–0.30% |
| 9 | Anti-foaming agent | 0–0.50% | 0.10–0.30% |
| 10 | Wetting agent | 0–1.00% | 0.25–0.75% |
| | (Total) | (100.00) | (100.00) |

Characteristically, Composition A preferably has a viscosity that is believed to be in the range of about 15,000 cps to about 25,000 cps (centipoises) measured with a Brookfield viscometer at 25° C. operating at 20 rpm spindle speed with a No. 4 spindle.

Preferably the water employed in the practice of this invention is filtered and is either deionized or distilled. A present preference is to employ a water and organic water miscible co-solvent medium comprised of about 85 to about 90 weight percent water with the balance up to 100 weight percent on a total solvent composition weight basis thereof being the co-solvent (as above characterized).

Composition B

Composition B is prepared by dissolving the quaternized cellulose ether in water. The preferred compositional characteristics of Composition B are identified in Table III:

TABLE III

COMPOSITION B

| | | Weight Percent (100% Basis) | |
|---|---|---|---|
| ID # | Component | Broad Range | Presently Most Preferred |
| 1 | Water | 95–99.5 | 98.00 |
| 2 | Quaternized cellulose ether | 0.5–5 | 2.00 |
| | (Total) | (100.00) | (100.00) |

Characteristically, Composition B preferably has a viscosity that is believed to be in the range of about 50,000 to about 55,000 centipoises measured at 25° C. with a Brookfield viscometer using a No. 4 spindle operating at a spindle speed of 20 rpm.

Composition C

Composition C is prepared by dissolving a peptizing agent in water and then dispersing a water swellable clay in the resulting solution. In general, the respective amount employed of each material is such that the resulting aqueous system forms a gel. As indicated above, the presently most preferred clay is a synthetic sodium magnesium lithium hectorite clay, and the presently most preferred peptizing agent is tetrasodium pyrophosphate. Composition C is preferably characterized as shown in Table IV:

TABLE IV

COMPOSITION C

| | | Weight Percent (100% Basis) | |
|---|---|---|---|
| ID # | Component | Broad Range | Presently Most Preferred |
| 1 | Water | 88–95% | 89.40 |
| 2 | Clay | 5–10% | 9.50 |
| 3 | Peptizing Agent | 0.50–2.0% | 1.10 |
| | (Total) | (100.00) | (100.00) |

Characteristically, Composition C preferably has a viscosity that is believed to be in the range of about 80,000 to about 90,000 cps measured at 25° C. with a Brookfield viscometer operating with a No. 4 spindle at as spindle speed of 20 rpm. Characteristically also, Composition C is a thixotropic gel.

Composition D

Composition D is prepared by dissolving the water dispersable, film-forming, crosslinkable carboxylated polymer and components 5–8 as identified below in a water-co-solvent mixture. Thereafter, a peptizing agent is dissolved in water, a water soluble clay is dispersed in the resulting solution which is added to the water/co-solvent mixture. Composition D is preferably characterized as shown in Table V:

TABLE V

COMPOSITION D

| | | Weight Percent 100% Basis | |
|---|---|---|---|
| ID # | Component | Broad Range | Presently Most Preferred |
| 1 | Water | 35.00–65.00% | 45.00% |
| 2 | Clay | 2.00–5.00% | 4.75% |
| 3 | Peptizing agent | 0.10–0.75% | 0.55% |
| 4 | Carboxylated copolymer | 30.00–60.00% | 45.75% |
| 5 | Anti-foaming agent | 0.05–0.20% | 0.15% |
| 6 | Wetting agent | 0.05–0.20% | 0.15% |
| 7 | Silica | 1.00–5.00% | 2.50% |
| 8 | Organofunctional silane | 0.01–0.25% | 0.15% |
| 9 | Organic co-solvent | 0.50–3.00% | 1.00% |
| | (Total) | (100.00) | (100.00) |

Characteristically, Composition D preferably has a viscosity that is believed to be in the range of about 1,000 to about 1,500 centipoises measured at 25° C. with a Brookfield viscometer using a No. 4 spindle at a spindle speed of 20 rpm.

(d) Preferred Blending Procedures

Compositions A, B and C are usable in various combinations to prepare disperse phase compositions which are then broken up under mixing shear force to form disperse phase bodies in a continuous phase comprised of Composition D.

Referring to the flow sheet in the appended drawing, which is submitted to be self-explanatory, it is seen that a Composition A is blended with either Composition B or Composition C, and preferably with both such Compositions B and C, to prepare a disperse phase composition which is homogeneous. The preferred weight ratios of Composition A to such Compositions B and/or C, as the case may be, and also the preferred viscosities of the resulting disperse phase blend homogeneous compositions, are as shown in Table VI below:

TABLE VI

DISPERSE PHASE COMPOSITIONS

| I.D. No. | Disperse Phase Composition of | Preferred Approx. Weight Ratio of Composition A to Other Composition(s) (B or B + C) | Preferred Approx. Viscosity Range (CPS) of Blended Disperse Phase Composition[1] |
|---|---|---|---|
| 1 | A + B | 85:15 to 80:20 | 25,000–27,500 |
| 2 | A + C | 85:15 to 80:20 | 30,000–33,000 |
| 3 | A + B + C | 70:15:15 to 80:10:10 | at least 35,000[2] |

Table VI footnotes
[1] All viscosities are measured in centipoises at 25° C. with a Brookfield viscometer using a No. 4 spindle operating at 20 rpm.
[2] More preferably, this viscosity is not greater than about 85,000 centipoises (so measured).

The disperse phase compositions are conveniently prepared using simple mechanical blending procedures and conventional mixing apparatus with the amount of mixing shear force used being at least sufficient to produce a uniform and homogeneous product blend. As shown in Table VI, the viscosity of a resulting disperse phase composition appears to be characteristically greater than that of the Composition A that is incorporated therein.

As indicated, preferred disperse phase compositions incorporate all three of the Compositions A, B and C. While such an (A+B+C) composition can be prepared by any convenient procedure, such as by first blending together Compositions A and B or Compositions A and C, and then further blending with the resulting blend a third Composition (either Composition C or B, as the case may be), it is presently preferred to first mix together Composition A and C in a weight ratio within the range shown in Table VI and then thereafter to mix Composition B therewith using a weight ratio sufficient to achieve a mixing weight ratio as shown in Table VI for all three of such Compositions A, B and C.

An (A+B+C) composition characteristically appears to have a viscosity that is greater than either as (A+B) composition or an (A+C) composition. It is theorized, and there is no intent herein to be bound by theory, that the reason for such increase is that the quaternized cellulose ether has reacted in some now unknown manner with at least one component present in the (A+B+C) composition, perhaps the carboxylated crosslinkable polymer. An (A+B+C) composition, particularly one prepared by the above indicated preferred procedure, appears to have better tack and elasticity characteristics than other such disperse phase compositions.

The (A+B), (A+C) and (A+B+C) disperse phase compositions of the present invention all appear to be novel over all known prior art teachings pertaining to multicolor aqueous disperse phase compositions, and to have higher viscosities than any previously known aqueous pigmentable composition of the type usable for the disperse phase in multicolor paints.

The (A+B), (A+C) and (A+B+C) disperse phase compositions are used to make multicolor paints of the invention by the following procedure:

First, at least two different (A+B), (A+C) or (A+B+C) compositions are each prepared, each preferably being made by the preferred procedure described above. Each such (A+B), (A+C) and (A+B+C) composition of such plurality is prepared using a differently colored pigment; thus, each composition has a different apparent color. Preferably all such compositions for use in any given multicolor paint are of the same type, that is, (A+B), (A+C) and (A+B+C).

Next, the plurality of the different (A+B), (A+C) or (A+B+C) compositions are blended together with a preformed continuous phase composition which is comprised of a clear or pigmented vehicle as in Composition D. In general, Composition D used as a continuous phase in a multicolor paint of this invention should have at the time of blending with (A+B), (A+C), or (A+B+C) compositions a viscosity that is preferably in the range of about 3,000 to about 7,000 cps as measured at 25° C. with a Brookfield viscometer operating at 20 rpm and using a No. 4 spindle. Such viscosity is more preferably in the range of about 5,000 to about 6,000 cps.

In general, the viscosity of the continuous phase is less than the viscosity of the gel phase composition. Preferably, the ratio of the viscosity of the continuous phase composition to the viscosity of each of the disperse phase compositions (comparably measured) is in the range of about 1:5 to about 1:10 with a viscosity ratio range of about 1:7 to about 1:8.5 being presently more preferred.

The respective amounts of the individual (A+B), (A+C) and (A+B+C) compositions employed in a given multicolor paint can be varied according to the artistic preference of the formulator. Preferably, the weight ratio of the total weight of all (A+B), (A+C) and/or (A+B+C) compositions employed in a given multicolor paint of this invention to the weight of Composition D employed in such paint is in the range of about 1:1 to about 6:4, although larger and smaller weight ratios can be used, if desired.

In a product multicolor paint of this invention, such viscosity differences between the discontinuous phase compositions and the continuous phase compositions, and such a total weight ratio of weight of total discontinuous phase compositions to weight of continuous phase composition are desirable because such result in production of a product paint wherein the disperse phase bodies form and remain suspended and discrete during subsequent paint storage.

Disperse phase (A+B), (A+C) and (A+B+C) compositions can be blended with a continuous phase composition in any order or manner. During blending, the disperse phase compositions break up and disperse to form discontinuous phase bodies in the continuous phase. The mixing shear force used in the blending is inversely proportional to the average size of the disperse phase bodies formed. The resulting dispersion constitutes a multicolor paint according to this invention.

The discontinuous phase bodies are characterized by what is believed to be unusual and surprisingly greater structural integrity compared to the structural integrity of prior art discontinuous phase bodies, such as the bodies taught, for example, in the above referenced Sellars et al. U.S. Pat. No. 3,950,283.

A continuous phase which includes a crosslinkable Composition D exhibits superior film properties compared to continuous phases of the prior art.

Various mixing procedures can be employed. When, for example, a multicolor paint of this invention is prepared wherein the discontinuous phase color bodies are to have different sizes relative to one another, one can prepare the different sized discontinuous phase bodies in separate mixing operations with different Composition D batches using different mixing shear forces. Thereafter, the different and separately prepared continuous/ discontinuous phase dispersion compositions can be blended together. Preferably a mixing shear force is used in such a blending which is not larger than that used to make the largest size disperse phase bodies desired in the resulting mixed dispersions.

Study of the (A+B), (A+C) and (A+B+C) compositions indicates that each is a gel and remains a gel when formed into disperse phase bodies in a multicolor paint composition of the invention. The gel bodies formed from (A+B+C) compositions are believed to have the greatest internal structural integrity or strength.

Once the (A+B), (A+C) and (A+B+C) compositions are broken up by mixing in a Composition D, the resulting disperse phase bodies apparently cannot and do not separate to reform the respective original (A+B), (A+C) and/or (A+B+C) compositions. Apparently, the disperse phase particles or bodies each have a crosslinked surface and internal structure, and also an interfacial bonding relationship between the continuous phase and the discontinuous phase bodies. No discrete interfacial material layer, such as a shell wall or the like, is believed to exist between the disperse phase bodies and the continuous phase.

Typically, the disperse phase body particle sizes in a multicolor paint of this invention have a size in the range of about 0.2 to about 15 mm, but larger and smaller body or particle sizes can be employed, if desired.

The multicolor paint compositions of this invention are characteristically indefinitely storage stable, including shelf, shipping, thermal, and vibrational (mixing) aspects.

The excellent strength and stability characteristics of a multicolored paint composition of this invention provide a composition which can be brushed, rolled or sprayed where high shear forces are characteristically exerted upon the formulation being so applied, without disperse phase color body breakdown.

While a multicolor paint formulation of this invention characteristically contains at least two distinct colors, those skilled in the art will appreciate that a particular multicolor paint formulation may contain many different classes of distinctly separately colored disperse phase bodies, perhaps six or more, each individual identically colored group of discrete disperse phase bodies having been separately preliminarily prepared as an (A+B), (A+C) or (A+B+C) disperse phase composition as hereinabove described, before the disperse phase composition is blended into the continuous phase. Various ratios and proportions of respective (A+B), (A+C) and (A+B+C) compositions relative to one another can be used in blending, as indicated above.

An optional but preferred component of a multicolor paint of this invention is a neutralizer which is used for reasons of pH control and buffering. Examples of suitable neutralizers include potassium hydroxide, ammonium hydroxide, triethanolamine, dimethylethanol amine, mixtures thereof, and the like. The amount of neutralizer used can range from greater than zero up to about 0.6 weight percent on a 100 weight percent total paint composition basis. The neutralizer, when used, can be added at any convenient location along the blending sequence; for example, the neutralizer can be added to Composition A or to the final mixture of gel phase composition and continuous phase at the time when such are being blended together. The neutralizer can be preliminarily prepared as an aqueous solution or dispersion for ease in blending.

The compositional characteristics for a preferred class of multicolor paint compositions of this invention are summarized in the following Table VII:

TABLE VII

MULTICOLORED PAINT COMPOSITION

| | Presently Most Preferred | Preferred Range (About) |
|---|---|---|
| Water soluble, film-forming crosslinking polymer | 28.50 | 10–35 |
| Hydroxy (alkyl) cellulose | 0.35 | 0.1–0.5 |
| Pigment | 8.00 | 2–20 |
| Crosslinking agent | 1.00 | 0.5–3 |
| Quaternized cellulose ether | 0.15 | 0.05–2 |
| Silica | 1.20 | 0.5–3 |
| Clay | 3.00 | 1–10 |
| Peptizing agent | 0.35 | 0.1–1.0 |
| Organic co-solvent | 7.25 | 1.5–7.5 |
| Water | 49.50 | 20–80 |
| Wetting agent | 0.25 | 0.10–0.50 |
| Anti-foaming agent | 0.15 | 0.05–0.50 |
| Bonding agent | 0.10 | 0.05–0.25 |
| Neutralizer | 0.20 | 0.05–0.50 |
| (Total Weight Percent) | (100.00) | (100.00) |

It will be appreciated that a multicolor paint of the present invention can generally be applied by any conventional application method desired, utilizing spraying, brushing, roller, pad, or the like.

As the applied paint coating dries on a surface, the film-forming carboxylated polymer in combination with the same polymers present form a continuous film or coating in which the disperse phase bodies become located typically in adjacent relationship to one another. Both the water and the organic co-solvent (if present) evaporate. The resulting coating becomes fully crosslinked.

As the applied paint coating dries on a surface, the film-forming carboxylated polymer in combination with the same polymers present form a continuous film or coating in which the disperse phase bodies become located typically in adjacent relationship to one another.

A product dried coating displays excellent properties, especially water resistance, as well as abrasion (wear) resistance, thermal stability, washability, surface smoothness, and the like.

The invention is further illustrated by the following Examples.

EXAMPLES 1 AND 2.

Preparation of First and Second "Composition A"

Two embodiments of "Composition A" are prepared by blending together the following components in the respective amounts indicated using a Cowles blade operating at about 450 to about 1500 rpm in a mixer:

| FIRST & SECOND "COMPOSITION A" | | |
|---|---|---|
| | Ex. 1 | Ex. 2 |
| Water | 42.02 | 42.02 |
| Wetting agent (TAMOL 165) | 0.50 | 0.50 |
| Anti-foaming agent (NOPCO NXZ) | 0.20 | 0.20 |
| Hydroxyethyl cellulose (Cellosize QP-100-MH) | 1.00 | 1.00 |
| Titanium dioxide (Dupont R-900) | 10.00 | — |
| Bone black (Ebonex 3D) | — | 8.20 |
| Barium sulfate (Barytes) | — | 1.80 |
| Carboxylated styrene acrylate copolymer (Pliolite 7103) | 33.33 | 33.33 |
| Butyl benzyl phthalate (Santicizer 160) | 1.50 | 1.50 |
| Organo functional silane (A-187) | 0.20 | 0.20 |
| Ester alcohol (TEXANOL) | 1.25 | 1.25 |
| Ethylene glycol butyl ether (Butyl Cellosolve) | 3.50 | 3.50 |
| Carbodiimide (UCARLNK XL-25-SE) | 6.00 | 6.00 |
| Ammonium hydroxide (28% Ammonia) | 0.50 | 0.50 |
| (Total Weight Percent) | (100.00) | (100.00) |

The "Composition A" of Example 1 has a white color and its Brookfield viscosity is about 20,000 cps measured at 25° C. using a No. 4 spindle operating at 20 rpm, and the "Composition A" of Example 2 has a black color and its Brookfield viscosity is about 25,000 cps similarly measured.

EXAMPLE 3

Preparation of Clear "Composition A"

A clear "Composition A" is prepared by blending together the following components in the respective amounts indicated using a Cowles blade operating at about 450 to about 1500 rpm in a mixer.

| CLEAR "COMPOSITION A" | |
|---|---|
| | Ex. 3 |
| Water | 50.02 |

-continued

| CLEAR "COMPOSITION A" | |
|---|---|
| | Ex. 3 |
| Wetting agent (TAMOL 165) | 0.50 |
| Anti-foaming agent (NOPCO NXZ) | 0.20 |
| Hydroxyethyl cellulose (Cellosize QP-100-MH) | 0.50 |
| Silica (OK 412) | 2.50 |
| Carboxylated styrene acrylate copolymer (Pliolite 7103) | 33.33 |
| Butyl benzyl phthalate (Santicizer 160) | 1.50 |
| Organo functional silane (A-187) | 0.20 |
| Ester alcohol (TEXANOL) | 1.25 |
| Ethylene glycol butyl ether (Butyl Cellosolve) | 3.50 |
| Carbodiimide (UCARLNK XL-25-SE) | 6.00 |
| Ammonium hydroxide (28% Ammonia) | 0.50 |
| (Total Weight Percent) | (100.00) |

The "Composition A" of Example 3 is clear and its Brookfield viscosity is about 20,000 cps measured at 25° C. using a No. 4 spindle operating at 20 rpm.

EXAMPLE 4

Preparation of "Composition B"

A "Composition B" is prepared by blending together the following components in the respective amounts indicated using a Cowles blade operating at about 1000 to about 2500 rpm in a mixer:

| Water | 98.00 |
|---|---|
| Quaternized cellulose ether Polyquaternium-10 (UCARE Polymer JR-30) | 2.00 |
| (Total Weight Percent) | (100.00) |

The Brookfield viscosity of the resulting "Composition B" is about 50,000 cps measured at 25° C. using a No. 4 spindle operating at 20 rpm.

EXAMPLE 5

Preparation of "Composition C"

A "Composition C" is prepared by blending together the following components in the respective amounts indicated using a Cowles blade operating at about 750 to about 2000 rpm in a mixer:

| Water | 89.40 |
|---|---|
| Synthetic sodium magnesium lithium hectorite clay (Laponite RDS) | 9.50 |
| Peptizing agent (tetrasodium pyrophosphate | 1.10 |
| (Total Weight Percent) | (100.00) |

The Brookfield viscosity of the resulting "Composition C" is about 85,000 cps measured at 25° C. using a No. 4 spindle operating at 20 rpm.

EXAMPLE 6

Preparation of "Composition D"

A "Composition D" which is clear, pigmented, metallic or which includes a transparent dye is prepared by blending together the following components in the respective amounts indicated using a Cowles blade operating at about 750 to about 1,500 rpm in a mixer.

The same water dispersable, film-forming, crosslinkable carboxylated polymer of the discontinuous phase is preferably used in preparing "Composition D", which as indicated can be colorless or colored, as desired. The addition of such a polymer in a "Composition D" of a multicolor paint produces a more impregnable film with a higher solids content and better hiding properties relative to a paint which includes a "Composition D" formed with a similar, but non-carboxylated, polymer.

The use of the foregoing polymer in a "Composition D" of a multicolor paint also provides a more homogeneous paint film which improves the drying speed, the sheen control, washability, durability and water resistance of the final coating. When the foregoing polymer is crosslinked, a high degree of hardness, mar resistance, chemical resistance and thermal stability is provided. The resulting multicolor paint can be applied as a surface coating with a paint roller or brush and can be sprayed with spray equipment.

| | Clear Ex. 6a | Pigmented Ex. 6b | Metallic Ex. 6c | Transparent Dye Ex. 6d |
|---|---|---|---|---|
| Water | 44.70 | 44.70 | 44.70 | 44.70 |
| Clay | 4.75 | 4.75 | 4.75 | 4.75 |
| Peptizing agent | 0.55 | 0.55 | 0.55 | 0.55 |
| Carboxylated styrene acrylate copolymer (Pliolite 7103) | 47.07 | 37.07 | 43.57 | 46.07 |
| Anti-foaming agent (NOPCO NXZ) | 0.15 | 0.15 | 0.15 | 0.15 |
| Wetting agent (TAMOL 165) | 0.15 | 0.15 | 0.15 | 0.15 |
| Silica (OK412) | 2.50 | 2.50 | 2.50 | 2.50 |
| Organo functional silane (A-187) | 0.13 | 0.13 | 0.13 | 0.13 |
| Titanium dioxide (Dupont R-900) | — | 10.00 | — | — |
| Water miscible aluminum paste (StaphydroLac W-60-NL) | — | — | 2.50 | — |
| Organic co-solvent (Butyl Cellosolve) | — | — | 1.00 | — |
| Water miscible dye (NEROSOL Yellow R) | — | — | — | 1.00 |
| (Total Weight Percent) | (100.00) | (100.00) | (100.00) | (100.00) |

The Brookfield viscosity of the resulting "Composition D" is about 1,000–1,500 cps measured at 25° C. using a No. 4 spindle operating at 20 rpm.

EXAMPLE 7

Preparation of First Disperse Phase Gel Composition

A first disperse phase gel composition is prepared by blending together the following indicated amounts of each of Examples 1 and 4 using a Cowles blade operating at about 800 to 1500 rpm in a mixer:

| "Composition A" Example 1 (white) | 82.40 |
|---|---|
| "Composition B" Example 4 | 17.60 |
| (Total Weight Percent) | (100.00) |

The Brookfield viscosity of the resulting gel composition is about 26,000 cps measured at 25° C. using a No. 4 spindle operating at 20 rpm.

EXAMPLE 8

Preparation of First Disperse Phase Gel Composition

A first disperse phase gel composition is prepared by blending together the following indicated amounts of each Examples 1 and 5 using a Cowles blade operating at about 1000 to about 2000 rpm in a mixer:

| | |
|---|---|
| "Composition A" Example 1 (white) | 82.40 |
| "Composition C" Example 5 | 17.60 |
| (Total Weight Percent) | (100.00) |

The Brookfield viscosity of the resulting gel composition is about 31,000 cps measured at 25° C. using a No. 4 spindle operating at 20 rpm.

EXAMPLE 9

Preparation of First Disperse Phase Gel Composition

A first disperse phase gel composition is prepared by blending together the following indicated amounts of each Examples 1, 4 and 5 using a Cowles blade operating at about to about 2500 rpm in a mixer:

| | |
|---|---|
| "Composition A" Example 1 (white) | 70.00 |
| "Composition B" Example 4 | 15.00 |
| "Composition C" Example 5 | 15.00 |
| (Total Weight Percent) | (100.00) |

The Brookfield viscosity of the resulting gel composition is about 35,000 cps measured at 25° C. using a No. 4 spindle operating at 20 rpm.

EXAMPLE 10

Preparation of Second Disperse Phase Gel Composition

A second disperse phase gel composition is prepared by blending together the following indicated amounts of each Examples 2 and 4 using a Cowles blade operating at about 800 to 1500 rpm in a mixer:

| | |
|---|---|
| "Composition A" Example 2 (black) | 82.40 |
| "Composition B" Example 4 | 17.60 |
| (Total Weight Percent) | (100.00) |

The Brookfield viscosity of the resulting gel composition is about 29,500 cps measured at 25° C. using a No. 4 spindle operating at 20 rpm.

EXAMPLE 11

Preparation of Second Disperse Phase Gel Composition

A second disperse phase gel composition is prepared by blending together the following indicated amounts of each Examples 2 and 5 using a Cowles blade operating at about 1000 to about 2000 rpm in a mixer:

| | |
|---|---|
| "Composition A" Example 2 (black) | 82.40 |
| "Composition C" Example 5 | 17.60 |
| (Total Weight Percent) | (100.00) |

The Brookfield viscosity of the resulting gel composition is about 32,000 cps measured at 25° C. using a No. 4 spindle operating at 20 rpm.

EXAMPLE 12

Preparation of Second Disperse Phase Gel Composition

A second disperse phase gel composition is prepared by blending together the following indicated amounts of each Examples 2, 4 and 5 using a Cowles blade operating at about 1000 to about 2500 rpm in a mixer:

| | |
|---|---|
| "Composition A" Example 2 (black) | 70.00 |
| "Composition B" Example 4 | 15.00 |
| "Composition C" Example 5 | 15.00 |
| (Total Weight Percent) | (100.00) |

The Brookfield viscosity of the resulting gel composition is about 37,500 cps measured at 25° C. using a No. 4 spindle operating at 20 rpm.

EXAMPLE 13

Preparation of Third Disperse Phase Gel

A clear third disperse phase gel composition is prepared by blending together the following indicated amounts of each using a Cowles blade operating at about 1,000 to about 2,500 rpm in a mixer:

| | |
|---|---|
| "Composition A" Example 3 | 70.00 |
| "Composition B" Example 4 | 15.00 |
| "Composition C" Example 5 | 15.00 |

The Brookfield viscosity of the resulting clear gel composition is about 35,000 cps measured at 25° C. using a No. 4 spindle operating at 20 rpm.

EXAMPLE 14-17

Preparation of Multicolor Paint Including Composition D as the Continuous Phase

| | Ex. 14 White & Black | Ex. 15 Black Metallic | Ex. 16 Transparent Yellow Metallic | Ex. 17 Black & White |
|---|---|---|---|---|
| Composition D clear (Ex. 6a) | — | — | — | 46.60 |
| Composition D pigmented (Ex. 6b) | 46.60 | — | — | — |
| Composition D metallic (Ex. 6c) | — | 22.80 | — | — |
| Composition D transparent dye (Ex. 6d) | — | — | 22.80 | — |
| First disperse phase gel (white) Examples 7, 8 and 9 | 46.60 | — | — | 46.60 |
| Second disperse phase gel (black) Examples 10, 11 and 12 | — | — | — | 46.60 |
| Third disperse phase gel (clear) Example 13 | — | 22.80 | 22.80 | — |
| Composition D clear (Ex. 6a) | 1.20 | 25.00 | — | 1.20 |
| Composition D pigmented (Ex. 6b) | — | — | — | — |
| Composition D metallic (Ex. 6c) | — | — | 25.00 | — |
| Composition D transparent dye (Ex. 6d) | — | — | — | — |
| First disperse phase gel (white) Examples 7, 8 and 9 | — | — | — | — |
| Second disperse phase gel (black) Examples 10, 11 and 12 | 1.20 | 25.00 | — | 1.20 |
| Third disperse phase gel (clear) Example 13 | — | — | 25.00 | — |
| Butyl benzyl phthalate (Santicizer 160) | 1.00 | 1.00 | 1.00 | 1.00 |
| Ester Alcohol (TEXANOL) | 1.00 | 1.00 | 1.00 | 1.00 |
| Ethylene glycol butyl ether (Butyl Cellosolve) | 2.40 | 2.40 | 2.40 | 2.40 |

Throughout the preparation of the multicolor paints of Examples 14-17 above, a Cowles blade in a mixer operates in the range of about 400 to about 500 rpm. The Brookfield viscosity of the product multicolor paint is in the range of about 5,000 to about 7,000 cps measured at 25° C. using a No. 4 spindle operating at 20 rpm.

The foregoing multicolor paints exhibit the improved properties discussed above with reference to Example 6. The paint can be applied as a surface coating with a paint roller or brush and can be sprayed with spray equipment as described below.

EXAMPLE 18

Application of the Multicolor Paint

Each of the multicolor paints of the Examples 14–17 is applied using each of:

(1) roller application using a foam roller at 30–60 pps (pores per square inch);
(2) brush application using a foam, synthetic or bristle type brush;
(3) a conventional air spray set up with a pressurized feed tank and dual regulators. Binks Gun Model 2001 with an internal or external mix air nozzle assembly. Air pressures with an internal mix assembly: gun pressure, 30 psi and material air pressure 35 psi. With external mix nozzle assembly, air pressure at the gun is about 20 to 30 psi and air pressure of the material is about 10 to 15 psi;
(4) most airless sprayers. Pump type Graco Model PT2500 with 221–517 tip size and using application pressures of about 200 psi at the gun tip; and
(5) H.V.L.P. spray equipment (high volume, low pressure). Wagner Cap Spray Units CS5000 and CS8000).

It is found that a uniform multicolor coating is produced from each paint. Each coating dries to a tack-free film (or coating) in about 30 minutes in air. Maximum film properties are attainable after an additional post-curing time of 96 hours in air.

Each fully cured coating is found to pass the ASTM No. D-1308-79 water spot test, both opened and covered.

Drying time of a coated paint can be accelerated by forced air drying at 125°–150° F.

EXAMPLE 19 THROUGH 28

Other Embodiments

When each of the water soluble, film-forming, cross-linkable carboxylated polymers shown in Table VIII below is substituted for the carboxylated styrene acrylate copolymer employed in Examples 1 and 2, and then when each of such resulting "Compositions A" are then used to prepare multicolor paints as describe in the procedres of foregoing Examples, a multicolor paint is produced which, when coated as described in Example 18, is found to pass the water spot tests of ASTM D-1308-79.

TABLE VIII

| | Other Embodiments Using Crosslinkable Water Soluble Polymers | | | | | | | | | |
|---|---|---|---|---|---|---|---|---|---|---|
| | Example No. | | | | | | | | | |
| | 19 | 20 | 21 | 22 | 23 | 24 | 25 | 26 | 27 | 28 |
| Water | 37.85 | 37.85 | 42.02 | 50.76 | 42.02 | 41.95 | 37.85 | 45.35 | 42.85 | 42.85 |
| Wetting agent (TAMOL 165) | 0.50 | 0.50 | 0.50 | 0.50 | 0.50 | 0.50 | 0.50 | 0.50 | 0.50 | 0.50 |
| Anti-foaming agent (NOPCO NXZ) | 0.20 | 0.20 | 0.20 | 0.20 | 0.20 | 0.20 | 0.20 | 0.20 | 0.20 | 0.20 |
| Hydroxyethyl cellulose (Cellosize QP-100-MH) | 1.00 | 1.00 | 1.00 | 1.00 | 1.00 | 1.00 | 1.00 | 1.00 | — | — |
| Titanium dioxide (Dupont R-900) | 10.00 | 10.00 | 10.00 | 10.00 | 10.00 | 10.00 | 10.00 | 10.00 | 10.00 | 10.00 |
| Carboxy-modified acrylic - | | | | | | | | | | |
| (Hycan 26171) | 37.50 | | | | | | | | | |
| (Hycan 26092) | | 37.50 | | | | | | | | |
| vinyl chloride (Geon 460X45) | | | 33.33 | | | | | | | |
| vinylidene copolymer (Geon 450X61) | | | | 24.59 | | | | | | |
| special acrylonitrile (Hycan 1572) | | | | | 33.33 | | | | | |
| styrene butadiene (Goodrite 2570X59) | | | | | | 25.42 | | | | |
| vinyl acetate (Polyco 2142) | | | | | | | 37.50 | | | |
| styrene butadiene (Darex 5101) | | | | | | | | 30.00 | | |
| Waterborne aliphatic urethane "Sancure" 898 | | | | | | | | | 40.00 | — |
| Waterborne aliphatic urethane "Q-Thane" QW-18 | | | | | | | | | — | 40.00 |
| Butyl benzyl phthalate (Santicizer 160) | 1.50 | 1.50 | 1.50 | 1.50 | 1.50 | 1.50 | 1.50 | 1.50 | — | — |
| Organo functional silane (A-187) | 0.20 | 0.20 | 0.20 | 0.20 | 0.20 | 0.20 | 0.20 | 0.20 | 0.20 | 0.20 |
| Ester alcohol (TEXANOL) | 1.25 | 1.25 | 1.25 | 1.25 | 1.25 | 1.25 | 1.25 | 1.25 | — | — |
| Ethylene glycol butyl ether (Butyl Cellosolve) | 3.50 | 3.50 | 3.50 | 3.50 | 3.50 | 3.50 | 3.50 | 3.50 | — | — |
| Carbodiimide (UCARLNK XL-25-SE) | 6.00 | 6.00 | 6.00 | 6.00 | 6.00 | 6.00 | 6.00 | 6.00 | 6.00 | 6.00 |
| Ammonium hydroxide | 0.50 | 0.50 | 0.50 | 0.50 | 0.50 | 0.50 | 0.50 | 0.50 | 0.25 | 0.25 |

TABLE VIII-continued

| | Other Embodiments Using Crosslinkable Water Soluble Polymers | | | | | | | | | |
|---|---|---|---|---|---|---|---|---|---|---|
| | Example No. | | | | | | | | | |
| | 19 | 20 | 21 | 22 | 23 | 24 | 25 | 26 | 27 | 28 |
| (28% Ammonia) (Total Weight Percent) | (100.00) | (100.00) | (100.00) | (100.00) | (100.00) | (100.00) | (100.00) | (100.00) | (100.00) | (100.00) |

In the foregoing Examples, the hydroxyethyl cellulose can be replaced with: A) hydroxymethyl cellulose (Dow A type); B) hydroxypropyl cellulose (Aqualon Klucel S-97A type); and C) sodium carboxy methyl cellulose (Aqualon CMC-7-7H3SF). The carbodiimide crosslinker can be replaced by the polyfunctional aziridine crosslinking agent "Zama—7" from Virginia chemicals. The "Composition C" hectorite clay (Laponite RDS) can be replaced by: A) Laponite RD; B) Veegum T; and C) Macaloid. And the "Composition C" peptizing agent (tetrasodium pyrophosphate) can be replaced by: A) sodium pyrophosphate; B) sodium tripolyphosphate; and C) sodium hexametaphosphate.

While the foregoing description makes use of illustrative examples of various types, no limitations upon the present invention are to be implied or inferred therefrom.

What is claimed is:

1. A method for making a water-in-water multicolor paint comprising the steps of:
  (A) providing a first composition comprising on a 100 weight percent basis:
    (a) about 10 to about 40 weight percent dissolved, water dispersable, film-forming, crosslinkable, carboxylated polymer,
    (b) about 0.5 to about 2 weight percent dissolved hydroxy (lower alkyl) cellulose,
    (c) about 0.5 to about 10 weight percent dissolved crosslinking agent selected from the group consisting of polyfunctional aziridines and multifunctional carbodiimides,
    (d) about 0 to about 30 weight percent dispersed pigment,
    (e) about 0 to about 10 weight percent organic cosolvent, and
    (f) about 20 to about 80 weight percent water;
  (B) providing a second composition comprising on a 100 weight percent basis:
    (a) about 0.5 to about 5 weight percent dissolved cationic quaternized cellulose ether, and
    (b) about 95 to about 99.5 weight percent water;
  (C) providing a third composition comprising on a 100 weight percent basis:
    (a) about 0.5 to about 2 weight percent dissolved peptizing agent,
    (b) about 5 to about 10 weight percent dispersed water swellable clay, and
    (c) about 88 to about 95 weight percent water;
  (D) providing a further composition comprising on a 100 weight percent basis:
    (a) about 2 to about 5 weight percent dispersed water swellable clay,
    (b) about 0.1 to about 0.75 weight percent dissolved peptizing agent,
    (c) about 30 to about 60 weight percent water dispersable, film-forming, crosslinkable, carboxylated polymer,
    (d) about 0.05 to about 0.2 weight percent antifoaming agent,
    (e) about 0.05 to about 0.2 weight percent wetting agent,
    (f) about 1 to about 5 weight percent silica,
    (g) about 0.01 to about 0.25 weight percent organofunctional silane,
    (h) about 0.5 to about 3 weight percent organic co-solvent, and
    (i) about 35 to about 65 weight percent water, said fourth composition having a viscosity in the range of about 3,000 to about 7,000 centipoises;
  (E) blending said first composition with a composition selected from the group consisting of:
    (a) said second composition in the weight ratio range of about 85:15 through about 80:20 of said first composition to said second composition,
    (b) said third composition in the weight ration range of about 85:15 through about 80:20 of said first composition to said third composition, and
    (c) a combination of said second composition and said third composition in the weight ratio range of about 70:15:15 to about 80:10:10 of said first composition to said
    second composition to said third composition so as to produce a first disperse phase gel composition having a viscosity in the range of about 25,000 to about 85,000 centipoises; and
  (F) mixing said first disperse phase gel composition with said fourth composition so that the ratio of the viscosity of said fourth composition to the viscosity of said first disperse phase composition is in the range of about 1:5 to about 1:10, the mixing shear force used in said mixing being sufficient to break up said first disperse phase gel composition into discrete gel bodies dispersed in said fourth composition said mixing shear force being inversely proportional to the average size of said so formed disperse phase bodies, thereby to produce said multicolor paint.

2. The method of claim 1 wherein in said blending step (E) said first composition is so blended with said combination of said second composition and said third composition to produce said first disperse phase gel composition.

3. The method of claim 1 wherein a second disperse phase gel composition is prepared by said steps (A) through (C) and (D), said second disperse phase composition contains a pigment which results in a different coloration for said second disperse phase gel composition relative to said first disperse phase gel composition and said second disperse phase composition is likewise additionally mixed with said fourth composition and broken up into discrete gel bodies using a mixing procedure as described in said (F), thereby to produce a multicolor water-in-water paint.

4. The method of claim 3 wherein a plurality of further disperse phase gel compositions are prepared each by said steps (A) through (C) and (E), each of said further disperse phase gel compositions contains a pigment which is different from all others of said disperse phase gel compositions, and each of said further disperse phase compositions is mixed with said fourth composition and broken up into discrete gel bodies using a mixing procedure as described in said step (E), thereby to produce a multicolor water-in-water paint.

5. The method of claim 1 wherein said discontinuous aqueous phase is produced by blending in said process step (E) said first composition with said combination of said second composition and said third composition in the weight ratio range of about 70:15:15 to about 80:10:10 of said first composition to said second composition to said third composition.

6. A water-in-water multicolor paint comprising a discontinuous aqueous phase dispersed in a continuous aqueous phase,
said discontinuous aqueous phase being comprised of a plurality of discrete gel bodies, such gel bodies being comprised of a uniform aqueous composition containing in admixture:
water dispersable, film-forming, crosslinkable carboxylated polymer,
crosslinking agent selected from the class consisting of multifunctional carbodiimides and polyfunctional aziridines,
cellulose material selected from the class consisting of hydroxy (lower alkyl) cellulose and alkali metal carboxylated (lower alkyl) cellulose, and
at least one gel former selected from the class consisting of cationic quaternized ethyl cellulose, and preformed gel comprised of water-swellable clay, peptizing agent and water; and
said continuous aqueous phase comprising a preformed gel comprised of water dispersable, film-forming, crosslinkable carboxylated polymer, water swellable clay, peptizing agent and water, the viscosity of said continuous phase being less than the viscosity of said discontinuous phase measured under comparable conditions said paint having been prepared by the method of claim 1.

7. The paint of claim 6 wherein the viscosity of the continuous phase is in the range of about 1/5 to 1/10 that of the discontinuous phase.

8. The paint of claim 6 wherein said crosslinkable carboxylated polymer is a carboxylated styrene acrylate copolymer.

9. The paint of claim 6 wherein said crosslinkable polymer is a carboxylated styrene acrylate copolymer, said crosslinking agent is a multi-functional carbodiimide, said clay is a synthetic hectorite, and said peptizing agent is tetrasodium pyrophosphate, both of said gel formers are present, and at least some of said gel bodies are pigmented.

10. The paint of claim 6 wherein said crosslinkable carboxylated polymer is a carboxylated polyurethane.

11. The paint of claim 6 wherein said crosslinkable polymer is a carboxylated polyurethane, said crosslinking agent is a multi-functional carbodiimide, said clay is a synthetic hectorite, and said peptizing agent is tetrasodium pyrophosphate, both of said gel formers are present, and at least some of said gel bodies are pigmented.

12. The paint of claim 6 wherein said discontinuous phase includes an organic water miscible co-solvent.

13. The paint of claim 6 wherein said continuous phase further includes in admixture therewith
a water dispersable, film-forming crosslinkable carboxylated polymer,
a crosslinking agent selected from the class consisting of multifunctional carbodiimides and polyfunctional aziridines,
a cellulose material selected from the class consisting of hydroxy (lower alkyl) cellulose and alkali metal carboxylated (lower alkyl) cellulose, and
pigment.

14. The paint of claim 6 wherein the weight ratio of the weight of said disperse phase to the weight of said continuous phase is in the range of about 1:1 to about 6:4.

15. A coating produced by applying a continuous layer of a paint of claim 6 to a surface and then drying said so applied layer.

16. The method of claim 1 wherein said crosslinkable polymer is selected from the group consisting of carboxylated styrene acrylate copolymers and polyurethanes, said crosslinking agent is a multifunctional carbodiimide, said clay is a synthetic hectorite, and said peptizing agent is tetrasodium pyrophosphate, both of said gel formers are present, said step (E) is repeated a plurality of times, and each one of the resulting so produced plurality of disperse phase gel compositions has a different color relative to others thereof, and each one of said disperse phase gel compositions is so mixed with said fourth composition.

17. The method of claim 1 wherein the weight ratio of the total weight of said disperse phase gel composition to the weight of said fourth composition is in the range of about 1:1 to about 6:4.

18. A coating produced by applying a continuous layer of a paint of claim 9 to a surface and then drying said so applied layer.

19. A coating protected by applying a continuous layer of a paint of claim 6 to a surface and the drying of said so applied layer.

* * * * *

UNITED STATES PATENT AND TRADEMARK OFFICE
CERTIFICATE OF CORRECTION

PATENT NO. : 5,114,485

DATED : May 19, 1992

INVENTOR(S) : James F. Lynch and John Predkelis

Page 1 of 2

It is certified that error appears in the above-identified patent and that said Letters Patent is hereby corrected as shown below:

Col. 4, line 59 (in Table I), change "460x61" to --450x61--.

Col. 8, line 29, change "silozanes" to --siloxanes--.

Col. 9, line 56, change "as" to --a--.

Col. 17, line 18, before the word "to" insert --1,000--.

Col. 21, line 58 (in claim 1), change "further" to --fourth--.

Col. 22, line 24 (in claim 1), change "ration" to --ratio--.

Col. 22, line 61 (in claim 3), insert the word --step-- after the word "said".

Col. 23, line 5 (in claim 5), change "The method of claim 1" to --A paint of claim 6--.

UNITED STATES PATENT AND TRADEMARK OFFICE
CERTIFICATE OF CORRECTION

PATENT NO. : 5,114,485

DATED : May 19, 1992

INVENTOR(S) : James F. Lynch and John Predkelis

It is certified that error appears in the above-indentified patent and that said Letters Patent is hereby corrected as shown below:

Column 24, line 49, (in claim 19), change "6" to --1--.

Signed and Sealed this

Twenty-sixth Day of October, 1993

Attest:

BRUCE LEHMAN

Attesting Officer

Commissioner of Patents and Trademarks